US007513924B2

(12) United States Patent
French et al.

(10) Patent No.: US 7,513,924 B2
(45) Date of Patent: Apr. 7, 2009

(54) CYCLONIC SEPARATING APPARATUS

(75) Inventors: Timothy Alexander French, Devizes (GB); Ricardo Gomiciaga-Pereda, Malmesbury (GB); John Paul Rerrie, Malmesbury (GB); Andrew Phillip Stokes, Chippenham (GB)

(73) Assignee: Dyson Technology Limited, Wiltshire (GB)

( * ) Notice: Subject to any disclaimer, the term of this patent is extended or adjusted under 35 U.S.C. 154(b) by 536 days.

(21) Appl. No.: 10/565,967

(22) PCT Filed: Aug. 9, 2004

(86) PCT No.: PCT/GB2004/003414

§ 371 (c)(1),
(2), (4) Date: Jan. 26, 2006

(87) PCT Pub. No.: WO2005/016108

PCT Pub. Date: Feb. 24, 2005

(65) Prior Publication Data

US 2006/0179802 A1 Aug. 17, 2006

(30) Foreign Application Priority Data

Aug. 13, 2003 (GB) ................................ 0318939.6

(51) Int. Cl.
*B01D 45/12* (2006.01)

(52) U.S. Cl. .......................... 55/459.1; 55/450; 55/414; 55/416; 15/347; 15/353; 15/326; 181/231; 96/384

(58) Field of Classification Search ................... 55/447, 55/448, 450, DIG. 3, 459.1, 414, 416; 96/348, 96/387, 380–386; 181/231; 15/347, 353, 15/326

See application file for complete search history.

(56) References Cited

U.S. PATENT DOCUMENTS 522,769 A 7/1894 Thompson
2,771,157 A 11/1956 Gustavsson (Continued)

FOREIGN PATENT DOCUMENTS

GB 2007118 A 5/1979

(Continued)

OTHER PUBLICATIONS

International Search Report issued in counterpart International Application.

(Continued)

*Primary Examiner*—Duane Smith
*Assistant Examiner*—Dung Bui
(74) *Attorney, Agent, or Firm*—Morrison & Foerster LLP

(57) ABSTRACT

A cyclonic separating apparatus for separating solid material from a fluid includes a separating chamber, an inlet communicating with the separating chamber for carrying the fluid with the solid matter entrained therein to the separating chamber, and an outlet for carrying the fluid away from the separating chamber after the solid material has been separated therefrom. The outlet is formed by a conduit communicating with the interior of the separating chamber and having a longitudinal axis. A plurality of grooves are formed in an interior surface of the conduit outlet and extend in the same direction as the longitudinal axis. The presence of the grooves in the outlet has the effect of reducing noise generated by the apparatus when in use and also improves pressure recovery.

28 Claims, 7 Drawing Sheets

U.S. PATENT DOCUMENTS

| | | | |
|---|---|---|---|
| 5,498,273 | A | 3/1996 | Mann |
| 6,238,451 | B1 * | 5/2001 | Conrad et al. ................. 55/323 |
| 7,044,210 | B2 * | 5/2006 | Usui .......................... 165/177 |
| 2001/0042283 | A1 | 11/2001 | Oh et al. |
| 2003/0209126 | A1 * | 11/2003 | Demarest et al. .............. 83/876 |

FOREIGN PATENT DOCUMENTS

| | | | |
|---|---|---|---|
| GB | 2035151 | A | 6/1980 |
| WO | WO-83/03556 | A1 | 10/1983 |
| WO | WO-03/030702 | A2 | 4/2003 |
| WO | WO-03/030702 | A3 | 4/2003 |

OTHER PUBLICATIONS

Great Britain Search Report issued in counterpart GB Application No. GB 0318939.6.

* cited by examiner

CYCLONIC SEPARATING APPARATUS

FIELD OF THE INVENTION

The invention relates to cyclonic separating apparatus. Cyclonic separating apparatus is known to be used to separate materials from one another, those materials commonly being in different phases (eg, solids from gases, solids from liquids, or liquids from gases), although it is perfectly possible to use such apparatus to separate denser gases or liquids from lighter gases or liquids. Cyclonic separating apparatus is also known to be used to good effect in vacuum cleaners, where solid matter (dirt, dust and debris) is separated from an airflow and retained in the vacuum cleaner prior to disposal whilst the cleaned air is expelled into the atmosphere. The present invention is particularly, although not exclusively, suitable for use in vacuum cleaners.

BACKGROUND OF THE INVENTION

One of the problems known to be associated with vacuum cleaners is that of noise. It is also perceived that a vacuum cleaner having a higher measure of "airwatts" (which is related to the amount of suction developed by the cleaner at the inlet thereof) will perform better than a vacuum cleaner having a lower measure of airwatts. In relation to the latter, it is well understood that minimising friction losses and pressure drops within the cleaner will result in a maximised measure of airwatts.

The prior art shows that it is known to recover pressure in cyclonic separating apparatus by providing blades or vanes in the outlet thereof such that the spiralling airflow is straightened. See, for example, U.S. Pat. No. 2,771,157. In general, the outlets of cyclonic separating apparatus are normally formed by cylindrical tubes, also known as vortex finders. Outlets which are not cylindrical have occasionally been proposed and U.S. Pat. No. 522,769 illustrates a hexagonal outlet, although no reference is made in the description to the shape of the outlet, nor why the outlet is formed in this way.

SUMMARY OF THE INVENTION

It is an object of the invention to provide cyclonic separating apparatus which, when in use, is comparatively quiet. It is another object of the invention to provide cyclonic separating apparatus which, when used in a vacuum cleaner, provides the vacuum cleaner with a comparatively high measure of airwatts.

The invention provides cyclonic separating apparatus for separating solid material from a fluid, the apparatus having a separating chamber, an inlet communicating with the separating chamber for carrying the fluid with the solid matter entrained therein to the separating chamber, and an outlet for carrying the fluid away from the separating chamber after the solid material has been separated therefrom, the outlet being formed by a conduit communicating with the interior of the separating chamber and having a longitudinal axis, wherein a plurality of grooves are formed in an interior surface of the conduit, the grooves extending in the same direction as the longitudinal axis.

The provision of the grooves in the interior surface of the conduit (which forms the vortex finder) has the effect of reducing the amount of noise generated by the apparatus when in use, at least in comparison to cyclonic separating apparatus in which the grooves are not present but is in all other respects identical. Furthermore, the grooves have been found to produce pressure recovery in the airflow passing through the conduit in a manner similar to that produced by the aforementioned vanes shown in the prior art. Advantageously, though, the cost of providing simple longitudinal grooves in the interior surface of the conduit is likely to be considerably lower than the provision of the said vanes.

The reasons why the observed benefits, particularly in relation to noise, are achieved by the provision of the grooves is not fully understood. It is thought possible that the presence of the grooves may interfere with the precession of internal vortices around the conduit as the airflow passes out of the apparatus, thus reducing the amount of noise generated by these vortices. However, it may transpire that other explanations will be discovered at a later date.

Preferably, the grooves extend along at least one quarter of the length of the conduit, more preferably at least half of the length of the conduit and still more preferably substantially the entire length of the conduit. It is preferred that the grooves are all the same shape in cross-section with triangular and rectangular shapes being preferred.

In a preferred embodiment, adjacent grooves are spaced apart from one another by portions of the interior surface of the conduit. Preferably, the portions of the interior surface of the conduit lie on a cylindrical surface. More preferably, the width of each groove is smaller than, or substantially the same as, the width of each portion of the interior surface adjacent the groove.

The optimum number of grooves is believed to be at least eight and more preferably twelve, but a beneficial effect as been observed with as few as four grooves. Further beneficial effects have also been observed when the lowermost end of the conduit is provided with a radiused outer edge.

BRIEF DESCRIPTION OF THE DRAWINGS

Embodiments of the invention will now be described with reference to the accompanying drawings in which.

DETAILED DESCRIPTION OF THE INVENTION

Figure 1:
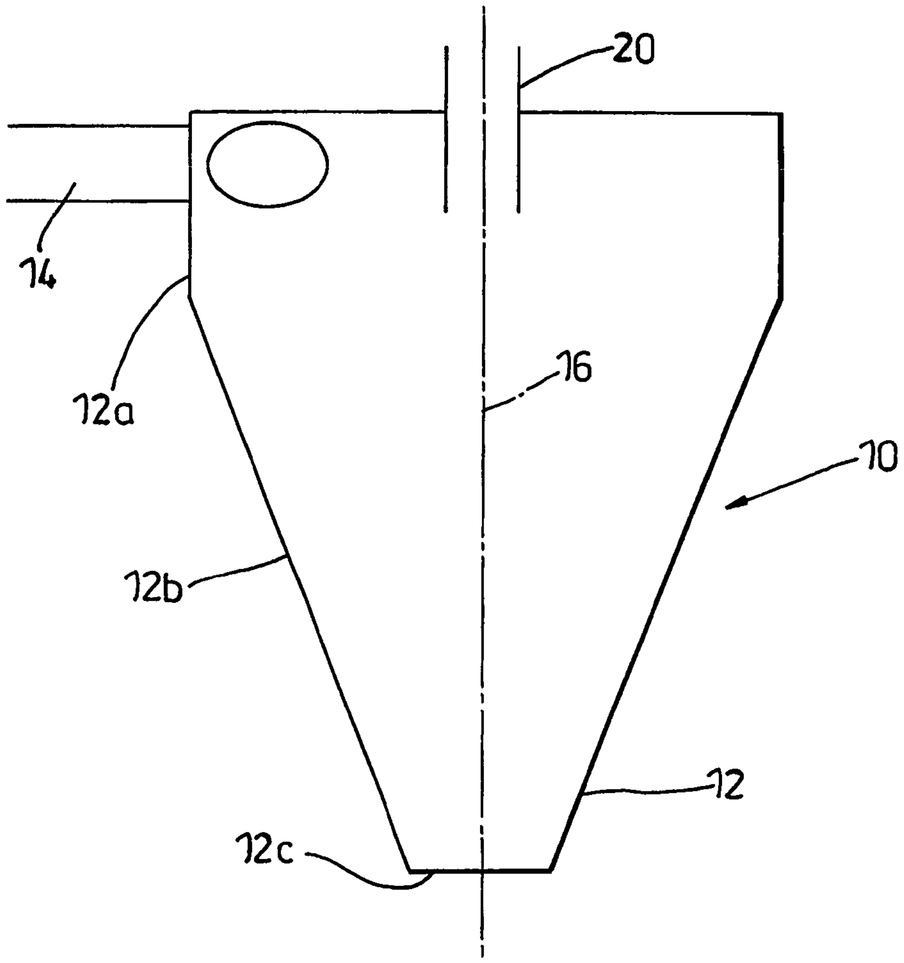
FIG. 1 is a schematic side view of cyclonic separating apparatus according to the present invention.

Cyclonic separating apparatus according to the invention is shown schematically in FIG. 1. The apparatus 10 generally comprises a cyclone body 12 having an inlet 14 and an outlet or vortex finder 20. The cyclone body 12 is illustrated here as having an upper cylindrical portion 12*a* and a lower frusto-conical portion 12*b* which tapers away from the cylindrical portion 12*a*. The frusto-conical portion 12*b* terminates in a cone opening 12*c* which communicates with a collector (not shown). However, it will be appreciated that cyclone bodies can equally be wholly cylindrical, wholly tapering or even outwardly tapering. Further, the length of the tapering portion in comparison to the cylindrical portion may be varied from that illustrated in FIG. 1, as may the angle of taper. The precise shape of the cyclone body 12 is not material to the present invention.

The inlet 14 is here illustrated as lying generally tangentially to the cyclone body 12. However, alternative inlet arrangements can be provided. All that is necessary is that the incoming fluid is caused to move in the cyclone body 12 in a swirling manner by means of which a vortex is formed therein. The tangential inlet 14 could be replaced by a radial or axial inlet together with further means for causing the necessary swirl, such as, for example, helical vanes (not shown). The inlet 14 is formed as a simple pipe and communicates with the interior of the cyclone body 12 at the upper end thereof. The vortex finder 20 is also formed generally as a simple tube and forms a conduit, although further details of the design of the vortex finder 20 will be explained below. The vortex finder 20 is positioned centrally of the cyclone body 12, also at its upper end, ie. at the same end as the inlet 14.

The operation of cyclonic separation apparatus 10 of the type described above is well understood. A fluid having material entrained therein (in the case of vacuum cleaners, this is an airflow having dirt, dust and debris entrained therein) enters the cyclone body 12 via the inlet 14. The arrangement of the inlet 14 is such that the fluid whirls around the interior of the cyclone body 12, thus forming a vortex therein. The matter entrained within the fluid flow is separated from the fluid and falls to the lower end of the cyclone body 12 where it exits the cyclone body 12 via the cone opening 12*c* and falls into the collector (not shown). If no cone opening or collector is provided, the separated matter may collect inside the cyclone body 12 at the lower end thereof.

Meanwhile, the fluid from which the matter has been separated passes inwardly towards the longitudinal axis 16 of the cyclone body 12 and exits the apparatus 10 via the vortex finder 20. The fluid is still spinning at very high angular velocities as it exits the apparatus 10 and a significant amount of noise is created as the spinning fluid passes through the vortex finder 20.

Figure 2:
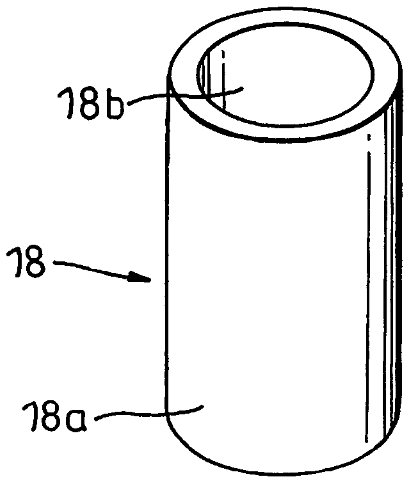
FIG. 2 is a perspective view of a vortex finder according to the prior art.

For comparison purposes, a known prior art vortex finder 18 is illustrated in FIG. 2. The known vortex finder 18 has a hollow cylindrical shape and has smooth outer and inner walls 18*a*, 18*b*.

Figure 3:
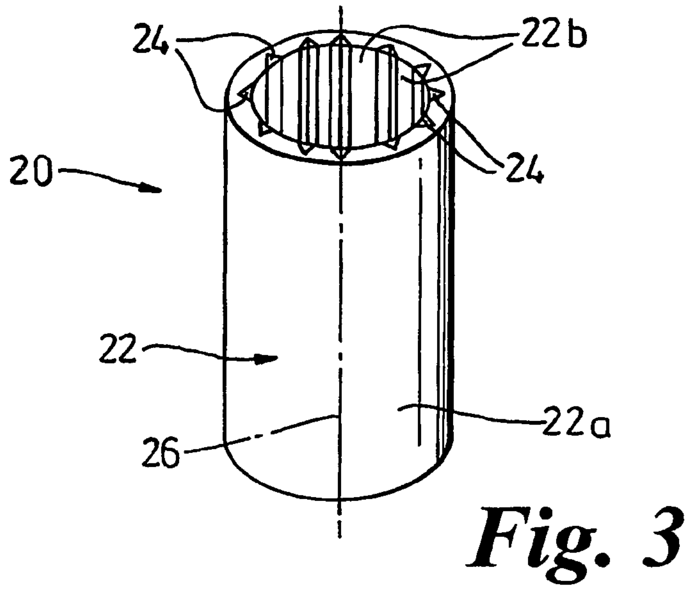
FIG. 3 is a perspective view of a vortex finder forming part of the cyclonic separating apparatus of FIG. 1.
Figure 4A:
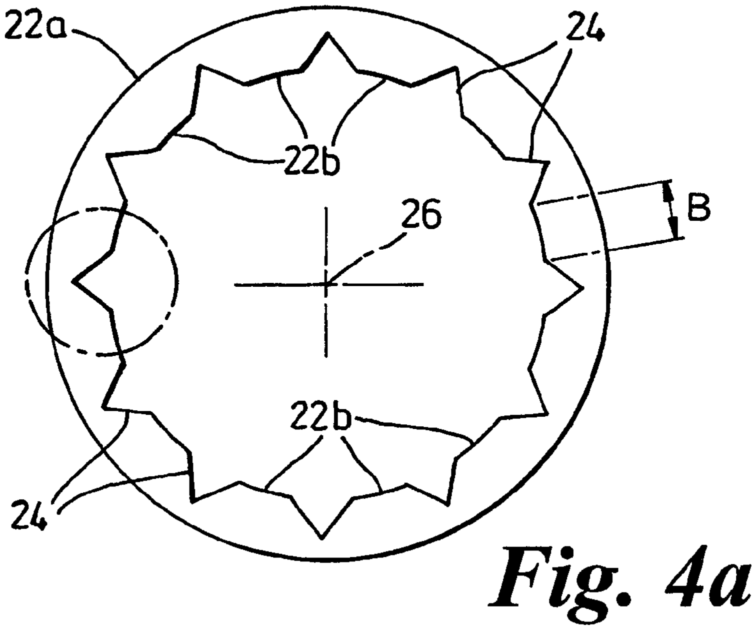
FIG. 4*a* is a cross-section through the vortex finder of FIG. 3 shown on an enlarged scale.
Figure 4B:
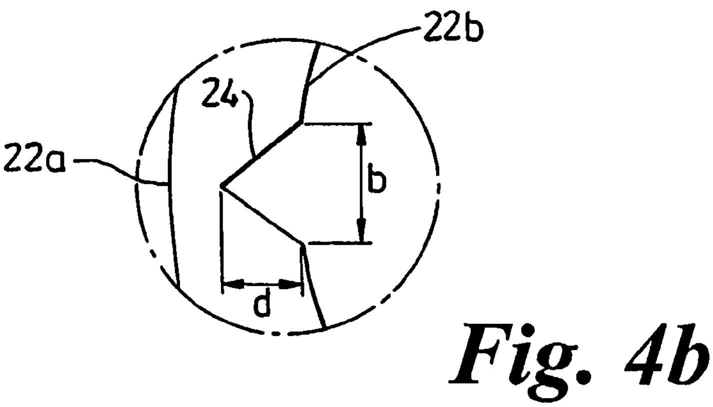
FIG. 4*b* shows a detail of FIG. 4*a* on a further enlarged scale.

FIGS. 3, 4*a* and 4*b* show the vortex finder 20 of the apparatus shown in FIG. 1 in more detail. The vortex finder 20 is generally cylindrical in shape and is preferably moulded from a plastics material to form a conduit. The cylindrical wall 22 has an outer surface 22*a* and an interior surface 22*b*. The outer surface 22*a* is cylindrical. The interior surface 22*b* has a plurality of grooves 24 formed therein. The grooves 24 are triangular in shape and extend from the interior surface 22*b* towards the outer surface. In the embodiment shown, twelve grooves 24 are equispaced about the longitudinal axis 26 of the vortex finder 20. Each groove 24 is identical in dimensions to the other grooves 24 and extends along the entire length of the vortex finder 20.

As can be seen from FIG. 4*b*, the breadth b of each groove is greater than the depth d thereof. As can be seen from FIG. 4*a*, each groove 24 is separated and spaced apart from adjacent grooves 24 by a portion of the interior surface 22*b*. The portions of the interior surface 22*b* which separate the grooves 24 lie on a cylindrical surface. The breadth b of each groove 24 is substantially the same as the breadth B of the portions of the interior surface 22*b* on either side thereof.

Figure 5A:
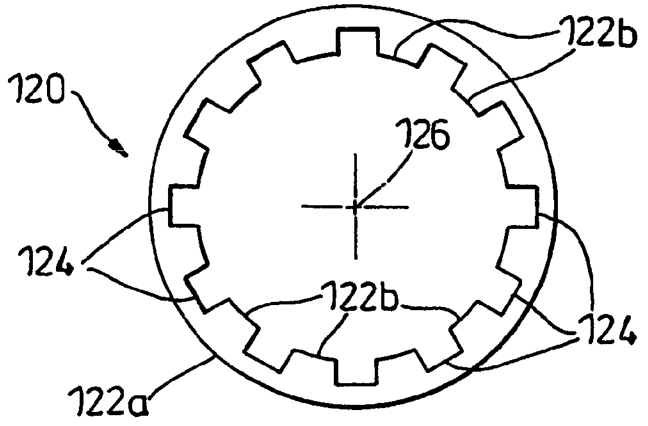
FIG. 5*a* is a cross-section through a first alternative vortex finder, similar to that shown in FIG. 4*a;*
Figure 5B:
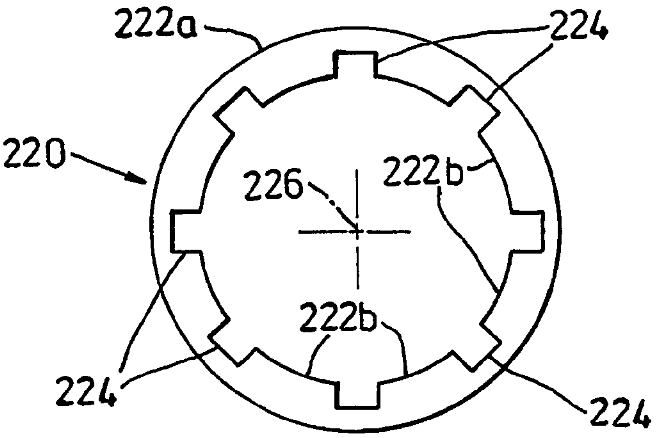
FIG. 5*b* is a cross-section through a second alternative vortex finder, similar to that shown in FIG. 4*a;*
Figure 5C:
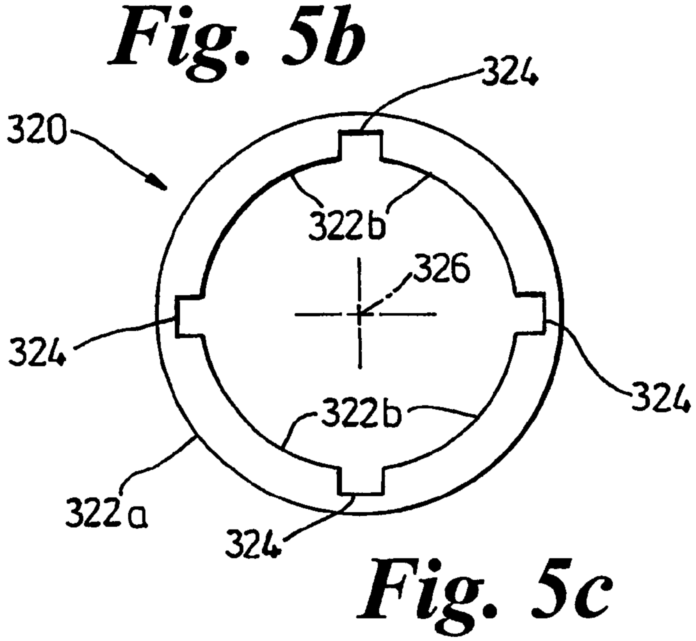
FIG. 5*c* is a cross-section through a third alternative vortex finder, similar to that shown in FIG. 4*a;*

FIGS. 5*a*, 5*b* and 5*c* illustrate alternative vortex finders suitable for use in cyclonic separating apparatus according to the invention. The vortex finder 120 illustrated in FIG. 5*a* is very similar to that shown in FIGS. 3, 4*a* and 4*b* except that the grooves 124 are rectangular in cross-section instead of triangular. As before, the depth of each groove 124 is less than the breadth thereof and the breadth of each groove is substantially the same as the breadth of the portions of the interior surface 122*b* on either side thereof. As before, twelve grooves 124 are equiangularly spaced about the longitudinal axis 126 of the vortex finder 120.

The vortex finder 220 illustrated in FIG. 5*b* differs from the vortex finder 120 illustrated in FIG. 5*a* only in that eight grooves 224 are provided instead of twelve. The grooves 224 are equiangularly spaced about the axis 226. The breadth of the portions of the interior surface 222*b* between adjacent grooves is thus greater than the breadth of the grooves 224 themselves. In the embodiment shown in FIG. 5*c*, the number of grooves 324 provided in the interior surface 322*b* of the vortex finder 320 is reduced to four. The breadth of the portions of the interior surface 322*b* between adjacent grooves is thus still greater than the breadth of the grooves 324 themselves.

Figure 6A:
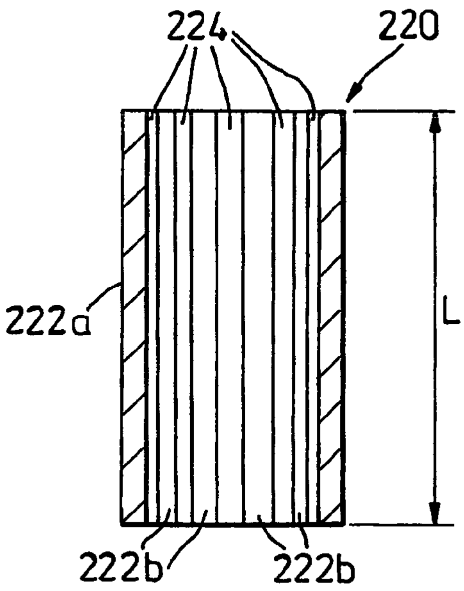
FIG. 6*a* is a longitudinal section through the vortex finder shown in FIG. 5*b;*
Figure 6B:
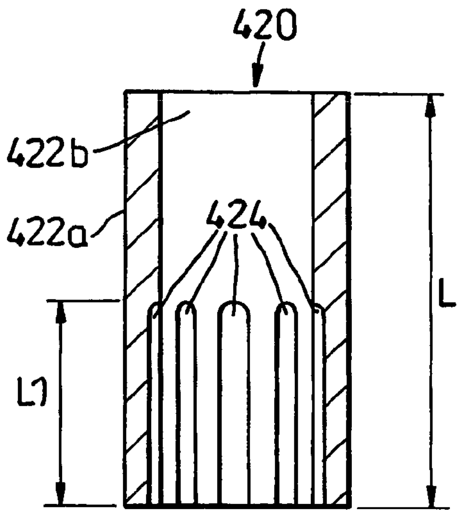
FIG. 6*b* is a longitudinal cross-section through a fourth alternative vortex finder, similar to that shown in FIG. 6*a;*
Figure 6C:
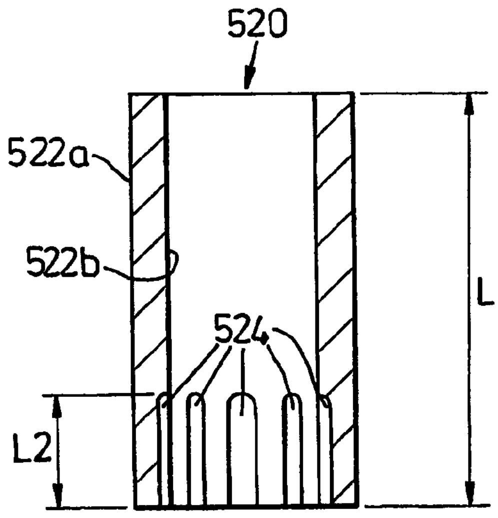
FIG. 6*c* is a longitudinal cross-section through a fifth alternative vortex finder, similar to that shown in FIG. 6*a;*

FIG. 6*a* is a longitudinal cross-section though the vortex finder 220 shown in FIG. 5*b*. As can be seen, the grooves 224 extend parallel to the axis 226 of the vortex finder 220 along the entire length thereof. FIG. 6*b* illustrates a further alternative embodiment of the present invention in which the grooves 424 extend along the vortex finder 420 to a distance L1 which is approximately half of the length L of the vortex finder 420. FIG. 6*c* illustrates yet another embodiment of the present invention in which the grooves 524 extend along the vortex finder 520 to a distance L2 which is approximately one quarter of the length L of the vortex finder 520. In each case, the grooves 424, 524 are located in the upstream end of the respective vortex finder 420,520.

Figure 6D:
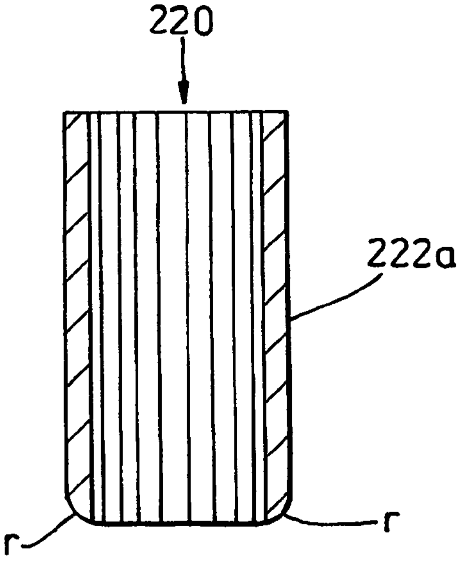
FIG. 6*d* is a longitudinal cross-section through a sixth alternative vortex finder, similar to that shown in FIG. 6*a;*

FIG. 6*d* illustrates a modification to the vortex finder 220 shown in FIGS. 5*b* and 6*a* in which the upstream end of the vortex finder 220 has a radius r applied to the outer surface 222*a*. This modification can be applied to any of the previously described embodiments. The radius r is sufficiently large to ensure that the outermost extremity of each groove 224 terminates in a different plane to the innermost extremity of the groove 224.

Figure 7:
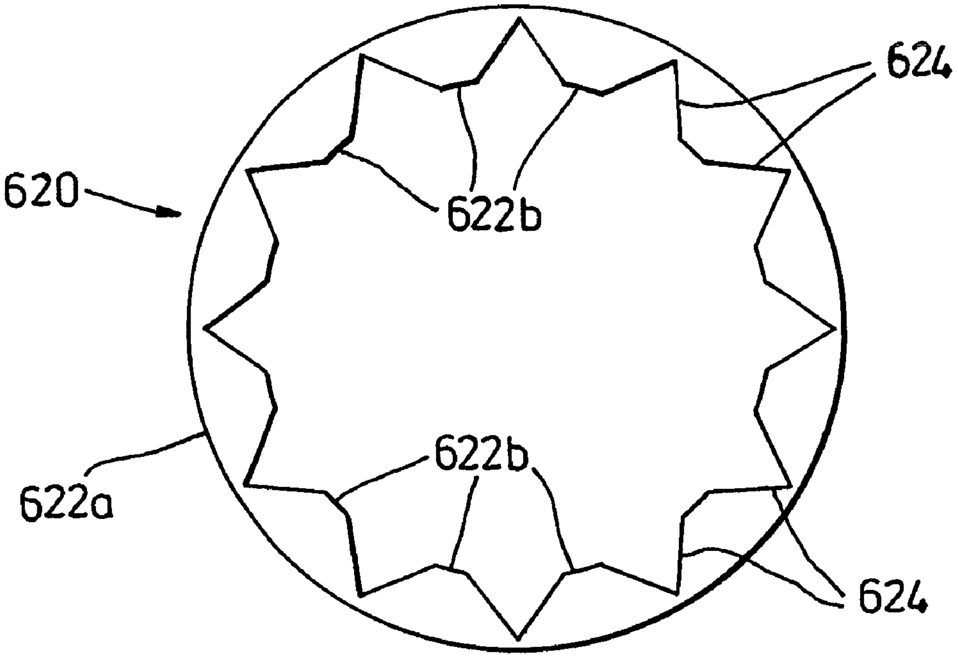
FIG. 7 is a cross-section through a seventh alternative vortex finder, similar to that shown in FIG. 4*a;*

FIG. 7 shows a further alternative vortex finder 620 which is similar to that shown in FIGS. 3, 4*a* and 4*b*. The vortex finder 620 differs from that shown in the previous drawings in that the grooves 624 are larger than the grooves 24. This has the effect of reducing the breadth of the portions of the interior surface 622*b* between the grooves 624 so that the breadth of the portions of the interior surface 622*b* between the grooves 624 is smaller than that of the grooves 624 themselves. Experiments show that reducing the breadth of the portions of the interior surface 622*b* to less than that of the grooves 624 improves the performance of the cyclonic separating apparatus at least in relation to noise reduction.

Figure 8:
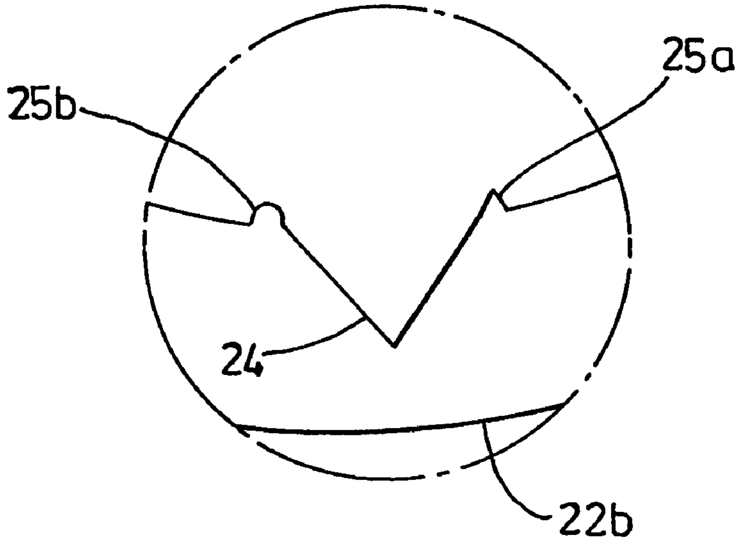
FIG. 8 shows a detail of the vortex finder shown in FIG. 4*a*.

It has also been found that the amount of noise reduction achievable is increased if a small ridge or protrusion is formed along at least one edge of the groove 24. FIG. 8 illustrates two alternative protrusions 25*a*, 25*b*, one being illustrated on each side of the groove 24. The protrusion 25*a*, located in FIG. 8 to the right of the groove 24, is generally triangular in shape, having straight sides and a sharp apex. The protrusion 25*b*, located to the left in FIG. 8, is generally rounded in profile. Each protrusion 25*a*, 25*b* extends outwardly from the interior surface 22*b* towards the axis 26 and along the length of the groove 24. It is envisaged that the protrusions may however extend only part way along the groove 24 and that only one protrusion 25*a*, 25*b* may be provided adjacent each groove 24. Furthermore, it is possible that a similar noise-reducing effect may be achievable by providing protrusions 25*a*, 25*b* adjacent only some of the grooves 24 provided in the interior surface 22*b* of the vortex finder 20.

Figure 9A:
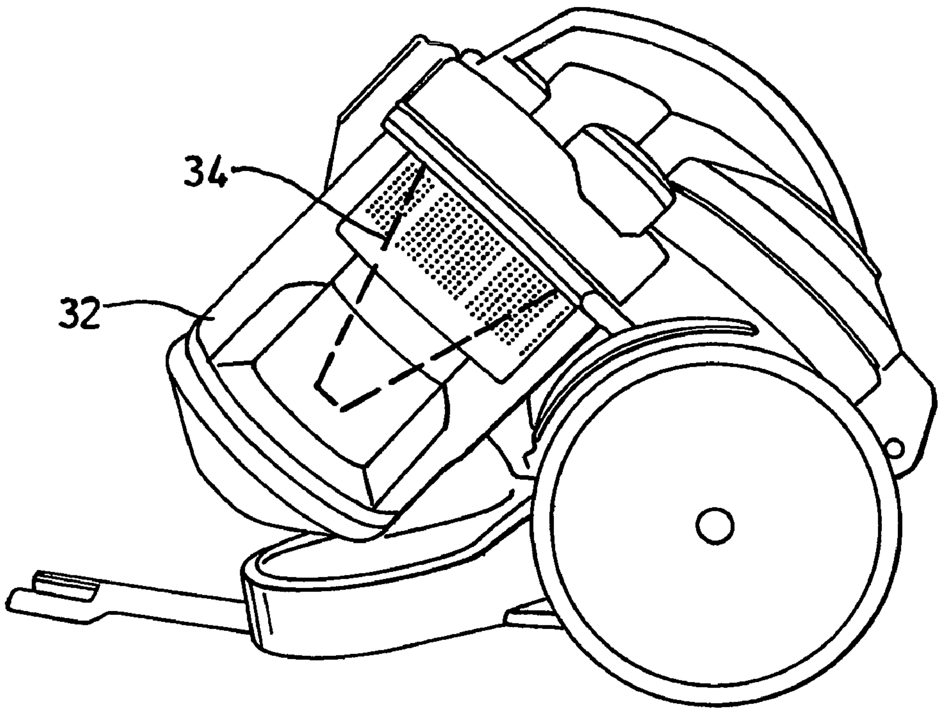
FIGS. 9*a*, 9*b* and 9*c* illustrate vacuum cleaners in which cyclonic separating apparatus according to the invention may be utilised.
Figure 9B:
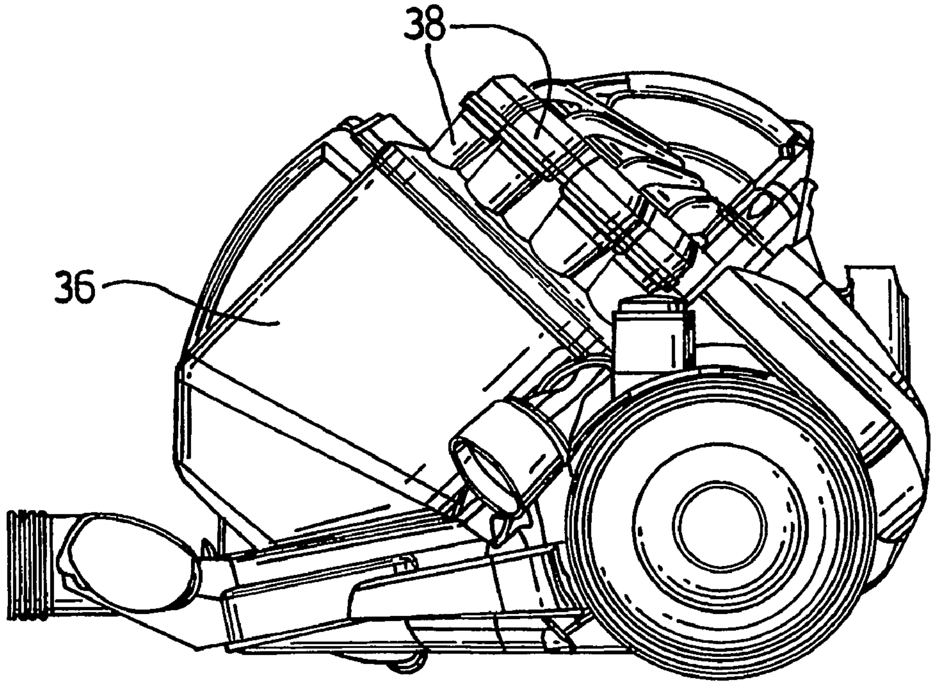
Figure 9C:
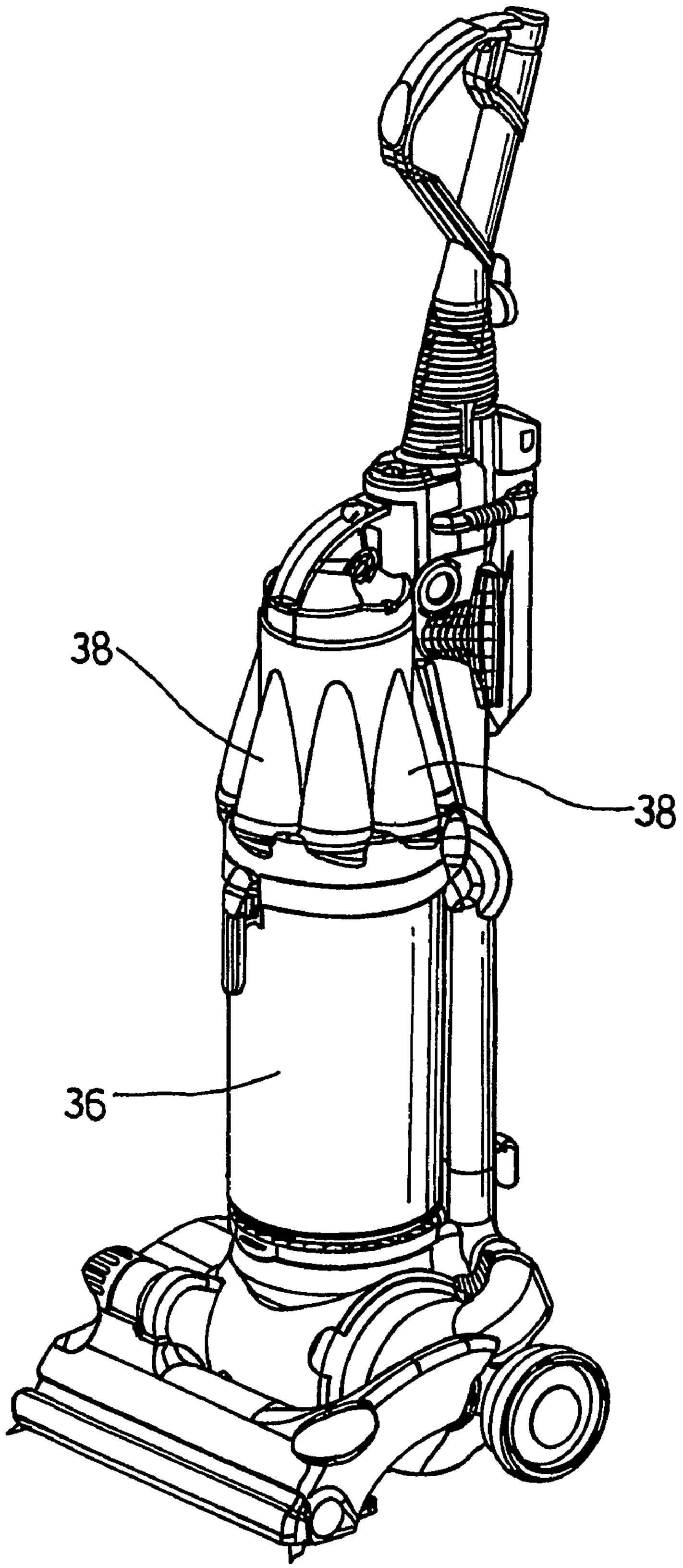

FIGS. 9*a*, 9*b* and 9*c* illustrate three different types of vacuum cleaner in which cyclonic separating apparatus according to the invention can advantageously be utilised. The cylinder vacuum cleaner shown in FIG. 8*a* incorporates two single cyclones 32, 34 arranged in series, one of which is located inside the other. It is envisaged that the invention would be utilised to its best advantage in relation to the interior cyclone 34. FIGS. 8*b* and 8*c* illustrate cylinder and upright vacuum cleaners respectively in each of which a single upstream cyclone 36 is followed by a plurality of downstream cyclones 38 arranged in parallel. The invention is expected to be of the greatest benefit when used in relation to some or all of the downstream cyclones 38.

It has been found that, by replacing the traditional, cylindrical vortex finder with a vortex finder having longitudinal grooves extending along at least part of its length, the noise generated by the cyclonic separating apparatus, at least when used in a vacuum cleaner, is reduced. Furthermore, the grooves appear to be able to achieve a significant amount of pressure recovery in the airflow as it exits the cyclonic separating apparatus. This has significant benefits to the consumer in that the airwatts achievable by the vacuum cleaner is increased, which in turn has a beneficial effect on the pickup performance of the cleaner.

The invention is not intended to be limited to the precise details of the embodiments shown in the accompanying drawings. Variations and modifications will be apparent to a skilled reader. For example, the grooves need not be precisely equiangularly spaced about the longitudinal axis of the vortex finder. The number of grooves provided could be varied and their shape could also be other than rectangular or triangular.

The invention claimed is:

1. A cyclonic separating apparatus for separating solid material from a fluid, comprising a separating chamber, an inlet communicating with the separating chamber for carrying the fluid with solid matter entrained therein to the separating chamber, and an outlet for carrying the fluid away from the separating chamber after the solid material has been separated therefrom, the outlet being formed by a conduit communicating with an interior portion of the separating chamber and having a longitudinal axis, wherein a plurality of grooves are formed in an interior surface of the conduit and extend in the same direction as the longitudinal axis.

2. The cyclonic separating apparatus as claimed in claim 1, wherein the grooves extend substantially parallel to the longitudinal axis.

3. The cyclonic separating apparatus as claimed in claim 2, wherein the grooves extend along the conduit for at least one quarter of the length thereof.

4. The cyclonic separating apparatus as claimed in claim 3, wherein the grooves extend along the conduit for at least half of the length thereof.

5. The cyclonic separating apparatus as claimed in claim 4, wherein the grooves extend along substantially the entire length of the conduit.

6. The cyclonic separating apparatus as claimed in claim 1, 2, 3, 4 or 5, wherein each groove is identical to the other grooves.

7. The cyclonic separating apparatus as claimed in claim 1, 2, 3, 4 or 5, wherein each groove is triangular in shape.

8. The cyclonic separating apparatus as claimed in claim 1, 2 or 5, wherein each groove is rectangular in shape.

9. The cyclonic separating apparatus as claimed in claim 7, wherein the depth of each groove is less than the breadth of each groove.

10. The cyclonic separating apparatus as claimed in claim 7, wherein adjacent grooves are spaced apart from one another by portions of the interior surface of the conduit.

11. The cyclonic separating apparatus as claimed in claim 10, wherein the breadth of each groove is greater than the breadth of either of the portions of the interior surface adjacent the said groove.

12. The cyclonic separating apparatus as claimed in claim 10, wherein the breadth of each groove is substantially the same as the breadth of each portion of the interior surface adjacent the said groove.

13. The cyclonic separating apparatus as claimed in claim 10, wherein the portions of the interior surface of the conduit lie on a cylindrical surface.

14. The cyclonic separating apparatus as claimed in claim 1, 2, 3, 4 or 5, wherein the grooves are equiangularly spaced about the longitudinal axis.

15. The cyclonic separating apparatus as claimed in claim 1, 2, 3, 4 or 5, wherein at least four grooves are provided.

16. The cyclonic separating apparatus as claimed in claim 15, wherein at least eight grooves are provided.

17. The cyclonic separating apparatus as claimed in claim 16, wherein at least twelve grooves are provided.

18. The cyclonic separating apparatus as claimed in claim 1, 2, 3, 4 or 5, wherein the upstream end of the conduit outlet is radiused on the outer surface thereof.

19. A cyclonic separating apparatus for separating solid material from a fluid, comprising a separating chamber, an inlet communicating with the separating chamber for carrying the fluid with solid matter entrained therein to the separating chamber, and an outlet for carrying the fluid away from the separating chamber after the solid material has been separated therefrom, the outlet being formed by a conduit communicating with an interior portion of the separating chamber and having a longitudinal axis, wherein a plurality of grooves are formed in an interior surface of the conduit and extend in the same direction as the longitudinal axis, and wherein at least one inwardly projecting protrusion is provided adjacent at least one of the grooves.

20. The cyclonic separating apparatus as claimed in claim 19, wherein inwardly projecting protrusions are provided on both sides of the respective groove or grooves.

21. The cyclonic separating apparatus as claimed in claim 19, wherein the inwardly projecting protrusions extend along the whole of the length of the respective groove or grooves.

22. The cyclonic separating apparatus as claimed in claim 19, wherein each groove has projections provided on both sides thereof.

23. A cyclonic vacuum cleaner comprising the cyclonic separating apparatus as claimed in claim 1, 2, 3, 4 or 5.

24. The cyclonic vacuum cleaner of claim 23, wherein the grooves are identical grooves that are triangular in shape and extend substantially the entire length of the conduit.

25. The cyclonic separating apparatus as claimed in claim 19, wherein the grooves extend substantially parallel to the longitudinal axis.

26. The cyclonic separating apparatus as claimed in claim 25, wherein the grooves extend along the conduit for at least one quarter of the length thereof.

27. The cyclonic separating apparatus as claimed in claim 26, wherein the grooves extend along the conduit for at least half of the length thereof.

28. The cyclonic separating apparatus as claimed in claim 27, wherein the grooves extend along substantially the entire length of the conduit.

* * * * *